United States Patent [19]

Mohrenstein-Ertel et al.

[11] 4,353,433

[45] Oct. 12, 1982

[54] DAMPING COVERING

[75] Inventors: Michael Mohrenstein-Ertel, Deisenhofen; Helmut Albrecht, Miesbach, both of Fed. Rep. of Germany

[73] Assignee: Messerschmitt-Bolkow-Blohm Gesellschaft mit beschrankter Haftung, Munich, Fed. Rep. of Germany

[21] Appl. No.: 251,741

[22] Filed: Apr. 7, 1981

[30] Foreign Application Priority Data

Apr. 10, 1980 [DE] Fed. Rep. of Germany ....... 3013861

[51] Int. Cl.[3] ............................................. F16F 7/00

[52] U.S. Cl. ................................................. 181/207

[58] Field of Search ............................... 181/207-209; 105/452; 165/46; 295/7; 248/562, 564, 566, 605, 633, 636

[56] References Cited

U.S. PATENT DOCUMENTS

| | | | |
|---|---|---|---|
| 2,514,170 | 7/1950 | Walter et al. | 181/207 |
| 4,023,651 | 5/1977 | Heahss | 181/207 |

*Primary Examiner*—B. R. Fuller
*Attorney, Agent, or Firm*—W. G. Fasse; D. H. Kane, Jr.

[57] ABSTRACT

Body noise or mechanical vibrations are damped by a sound or noise damping covering that may be secured permanently or temperarily to the surfaces of a body to be damped in the manner of an adhesive tape. The tape or band type damping covering comprises two layers of platelet elements of highly elastic material interconnected with play, for example by hooks. The layers are so arranged that the platelet elements in one layer are staggered relative to the platelet elements in the other layer. An intermediate layer of a plastic type material is interposed between the two outer platelet layers. The plastic material converts shearing stresses and hence the vibrations into heat. The plastic material may be a gel which absorbs liquid.

8 Claims, 8 Drawing Figures

Fig. 1a
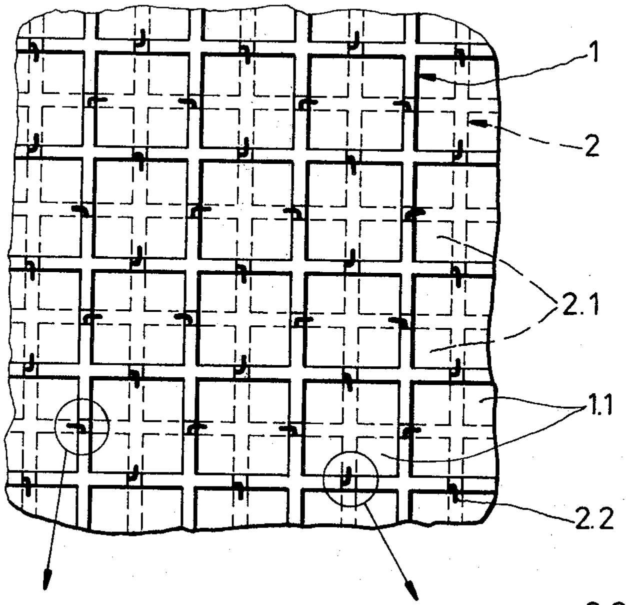
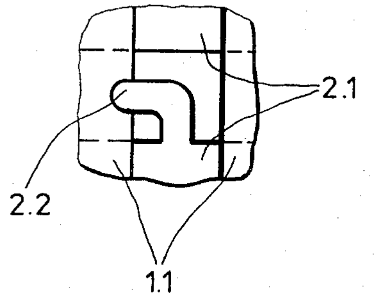
Fig. 1b
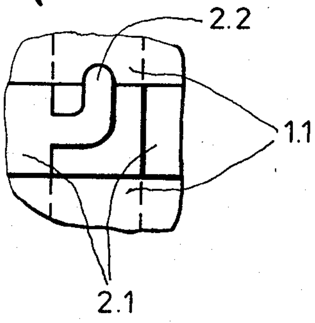
Fig. 1c

DAMPING COVERING

CROSS-REFERENCE TO RELATED APPLICATION

The present application relates to German Patent Application P 30 13 861.5, filed in the Federal Republic of Germany on Apr. 10, 1980. The priority of said German filing date is hereby expressly claimed.

BACKGROUND OF THE INVENTION

The invention relates to a sound damping covering for solid, permanent, or temporary attachment to the surfaces of a body to be damped. The covering comprises small platelet elements having a high elasticity, which are arranged next to each other and are staggered in two or more layers, whereby a material for the conversion of shear stresses into heat is located between the layers.

One such damping covering for example, is known from the German Patent Publication (DE-PS) 2,703,896 and is distinguished by a theoretically not to be surpassed relationship between the loss modulus of the damping covering and the modulus of elasticity of the body to be damped. This relationship represents a measure of the damping action of a damping covering. The damping mass in such a covering, according to the underlying theory, is supposed to absorb primarily the shearing stresses occurring between the platelets and to convert these shearing stresses into heat. The damping mass should simultaneously hold the separate layers of platelets together to assure a sensible or practical handling of the covering. Both characteristics are not compatible with each other in an ideal manner.

OBJECTS OF THE INVENTIONS

It is an object of the invention to produce a sound proofing insulation covering of the above-mentioned type, whereby damping materials with no or only small adhesive qualities may be utilized.

SUMMARY OF THE INVENTION

This problem is solved by a damping coating constructed according to claim 1, which may be further developed in an advantageous manner according to claims 2 to 4.

A band-shaped damping covering which may be rolled up for transport and storage purposes is advantageously constructed according to patent claims 5 or 6.

Since the platelets must be in intensive contact with the damping mass for the optimal transmission of vibrations causing shearing forces between the platelets, it is advantageous if, for example, the outer layers are braced or clamped according to the procedure described in claim 7, so that these outer layers effect a constant pressure on the damping mass and on the layers lying therebetween.

According to the theory described in the aforementioned patent, the exact maintaining of the layer thickness of the damping material between the layers of the platelets as well as the modulus of shear of the damping material are of critical importance. The satisfaction of these values is often difficult when processing liquid damping materials. This problem can be solved according to claim 8 for a sound proofing insulation covering utilizing a liquid absorbing gel.

The damping mass may then, for example, be processed in its solid phase as a film or foil and after the completion of the damping covering the damping mass can be brought to its desired values by a controlled soaking operation in a liquid.

BRIEF FIGURE DESCRIPTION

The figures described below show in a partially schematic manner, example embodiments for a damping covering according to the invention.

FIGS. 1*a–c* show the construction of a two-layered, laminar covering of platelet elements;

FIGS. 2*a–c* show the construction of a three-layered band-shaped damping covering;

Figure 2A:
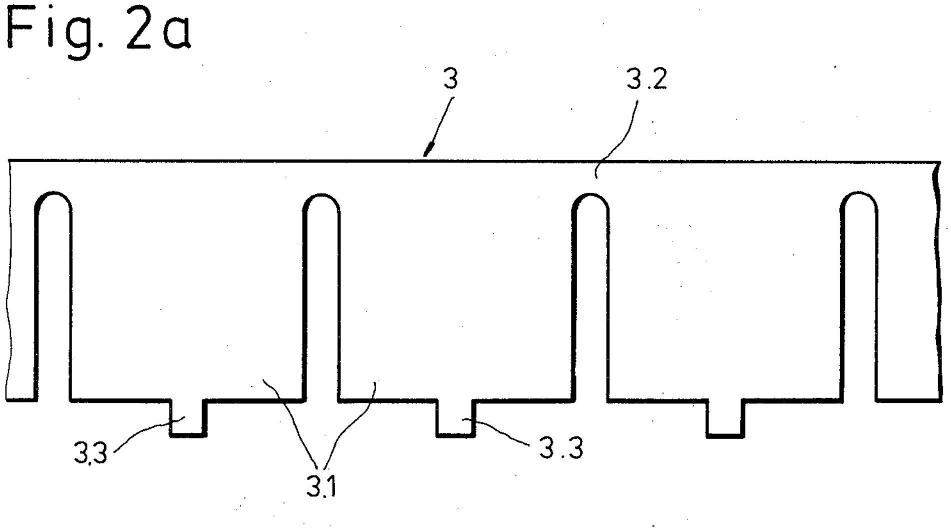

DETAILED DESCRIPTION OF PREFERRED EXAMPLE EMBODIMENTS AND OF THE BEST MODE OF THE INVENTION

The damping covering according to FIG. 1*a*, shown in a top plan view, comprises two layers 1 and 2 of quadratic platelet elements 1.1 and 2.1 made of a material of high elasticity, such as, for example, steel. The platelet elements of the two layers are staggered relative to each other in such a way that each platelet element of layer 1 uniformly covers the corners of four adjoining platelet elements of layer 2 and vice versa. A damping material, not shown, is located between the layers 1 and 2 to absorb or take up the shear stresses caused between the platelet elements by the introduction of body noise vibrations into the bottom layer 2. The bottom layer 2 is provided with an adhesive layer, not shown, for a solid, permanent, or for a temporary attachment to the body to be damped.

As may be seen from FIGS. 1*b* and *c*, the platelet elements 2.1, of the lower layer 2, are provided with tie-down elements 2.2, each of which are pushed through between two platelet elements 1.1 of the upper layer 1 and are bent over one of these platelet elements 1.1. If the tie-down elements 2.2 are arranged and bent over in the manner indicated in FIG. 1*a*, then each platelet element of layer 1 is held by two oppositely located tie-down elements 2.2 of two platelet elements in the lower layer 2. Since the holding by the tie-down elements 2.2 allows motion of the platelet elements in the surface plane, the introduced vibrations within one surface plane are not transferred by the tie-down elements 2.2 from one layer to the other. On the other hand, the tie-down elements prevent the whole covering from falling apart into its separate pieces if the damping material is not suited for holding the layers of platelets together.

Figure 2B:
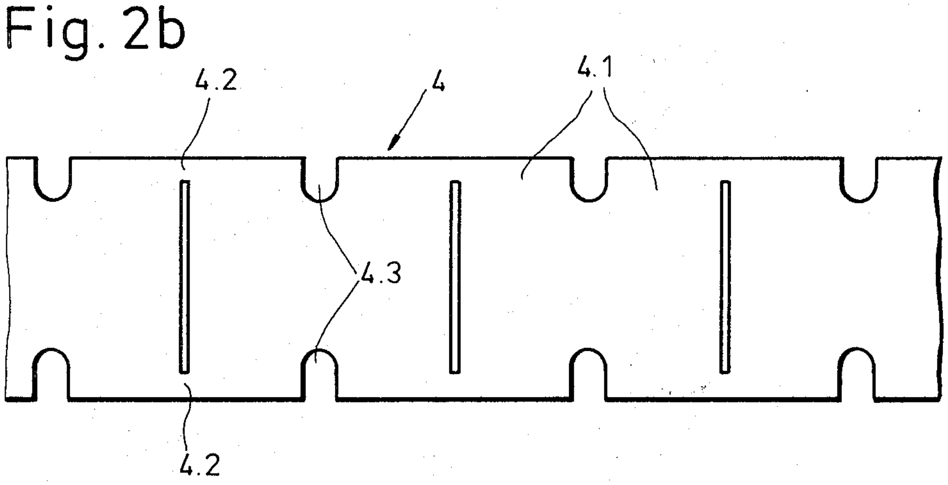
Figure 2C:
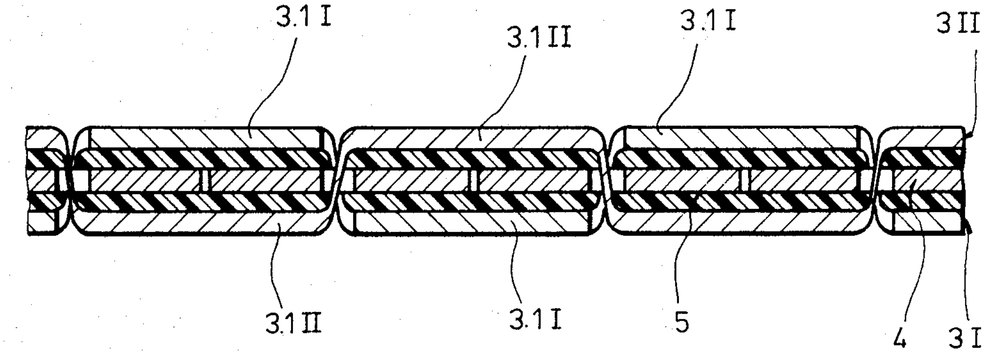

The band-shaped damping covering shown in section in FIG. 2*c* comprises two different bands or tapes of contiguous, interconnected platelet elements which are shown in a top view in FIGS. 2*a* and *b*. The so-called platelet band 3, shown in FIG. 2*a*, comprises rectangular or square platelet elements 3.1 arranged next to each other, which are interconnected at one edge by connecting strips 3.2. The other platelet band 4, shown in FIG. 2*b*, also comprises square or rectangular platelet elements arranged next to each other, which however are connected to each other at both edges by relatively weak connecting strips 4.2. The centers of the edges of each platelet element 4.1 have notches 4.3. The connecting strips 3.2 and 4.2 are so dimensioned, that the vibrations of one platelet element are not conveyed at all or only slightly to neighboring platelet elements.

Two bands or tapes 3I and 3II having platelets 3.1I and 3.1II are pressed into a square wave band to produce a tape-shaped damping covering according to FIG. 2*c.* Such bands 3I and 3II are of the type shown in FIG. 2*a.* In FIG. 2*c* the platelet elements 3.1I and 3.1II alternately form an upper or lower part of the substantially rectangular amplitude and whereby the connecting strips 3.2 shown in FIG. 2*a* are stretched and thereby tapered by the pressing operation. Two such bands 3I and 3II, are laterally pushed into each other with their free edges not provided with any connecting strips. Thus, these bands form the the upper and lower layers of platelets 3.1I and 3.1II of a damping tape, whereby respectively two platelet elements, one from the band 3I and the other from the band 3II, lie congruently one on top of the other. The space between the thus constructed layers is alternately filled with an odd number of staggered bands of platelets 4—one such band of platelets 4 is seen in FIG. 2*b*—and with layers of a damping material 5. The connecting strips 3.2 of the bands 3I and 3II or tapes of platelets thereby pass through the notches 4.3 of the platelet tape or band 4. The notches are so dimensioned that a defined clearance for play remains between one band of platelets 4 and one of the bands of platelets 3I or 3II.

If more than only one platelet band of the type shown in FIG. 2*b,* are inserted, then one group of platelet bands 4 must have notches in the range of the connecting strips 4.2, so that these bands of small plates can be staggered from the neighboring bands by one half of the length of one platelet.

The separate layers of platelets of the damping covering shown in FIG. 2*c* can neither fall out nor slide in the longitudinal direction in such a manner that the order of the individual platelet elements, required according to the theory, is fundamentally changed. In other words, that order is maintained.

Figure 3:
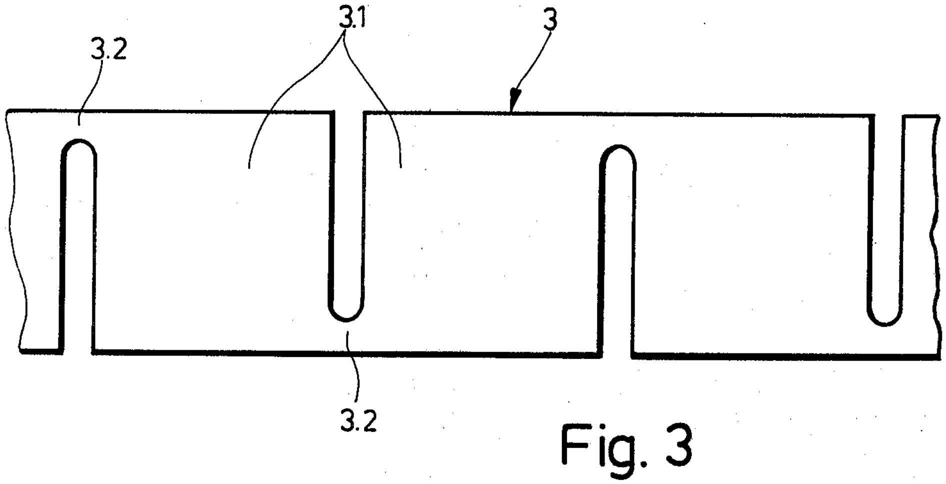
FIG. 3 shows a tape of platelets suited as a cover layer for a multi-layered damping covering.

A lateral sliding of the bands 3I and 3II of small platelets may be prevented by arranging outwardly extending tie-down tongues 3.3 on the outer edges of the platelet elements 3.1 as shown in FIG. 2*a.* These edges are not connected with each other by connecting strips. The tongues 3.3 are bent over, after two of these bands have been pushed into each other. Another possibility to prevent the damping covering from falling apart due to lateral sliding, comprises utilizing platelet bands 3 according to FIG. 3, in which the connecting strips between the platelet elements 3.1 are arranged alternatingly on one outer edge zone or the other.

Figure 4:
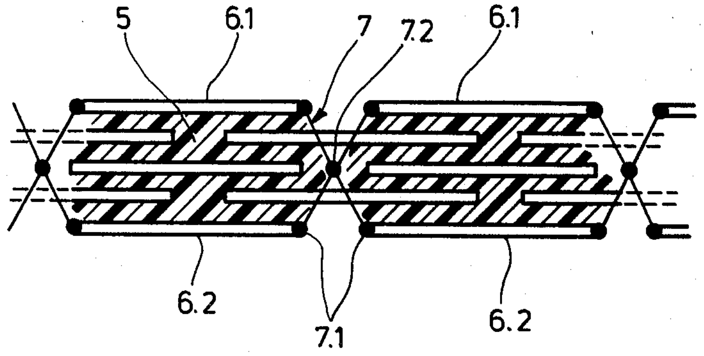
FIG. 4 shows a connection between the outer layers of a multi-layered damping covering.

A connection between the outer layers of a band-shaped damping covering is represented in a schematic manner in FIG. 4, in which the platelet elements 6.1 of the top layer of the damping band and the platelet elements 6.2 of the bottom layer are held together at the outer edges by means of tie members 7. These tie members 7 are rotatable or are at least easily movable within a definite angular range at the connecting points 7.1 with platelet elements as well as at the point of intersection 7.2. Connections of this type may, for example, comprise a thread mesh. Although the invention has been described with reference to specific example embodiments, it is to be appreciated that it is intended to cover all modifications and equivalents within the scope of the appended claims.

We claim:

1. A sound damping covering for solid, permanent or temporary attachment to surfaces of a body to be damped, comprising platelet elements of a high elasticity, which are arranged substantially next to each other and are staggered in two or more layers, a material for the conversion of shear stresses into heat located between the layers, wherein at least the platelet elements of both outer layers, as well as within one layer and also at least partially between the layers, are connected with each other, and wherein a play clearance is provided at least between certain platelet elements within the covering.

2. The covering of claim 1, wherein said play clearance is larger than a vibrational amplitude of a platelet element caused by the introduction of mechanical body noise vibrations.

3. The covering of claim 1 or 2, wherein the play clearance is determined by defined maximum tension or shearing forces, which act upon mechanical connections between two platelet elements.

4. The covering of claim 1, wherein said play clearance is limited by mechanical stops of slidable and/or rotating mechanical connections between two platelet elements.

5. The covering of claim 1 or 4, comprising connecting strips for connecting said platelet elements with each other and wherein at least a portion of the platelet elements of a layer comprises retaining elements, which hold at least some of the platelet elements in a further layer while retaining said play clearance.

6. The covering of claim 5, wherein outer layers of the covering comprise two bands of small platelet elements connected with each other at the outer range of their edges by means of said connecting strips, said connecting strips being interlaced with each other, and wherein an odd number of layers of platelet elements is located between said outer layers.

7. The covering of claim 6, comprising bracing elements for bracing outer platelet element layers against each other for stretching a band-shaped damping covering in the longitudinal direction.

8. The covering of claim 1, wherein said material for the conversion of shear stresses into heat is a liquid absorbing gel.

* * * * *